F. L. MAUPIN.
DEMOUNTABLE WHEEL RIM.
APPLICATION FILED FEB. 16, 1918.

1,292,348.
Patented Jan. 21, 1919.

Witnesses

Inventor
F. L. Maupin,
By Victor J. Evans
Attorney.

UNITED STATES PATENT OFFICE.

FRANK L. MAUPIN, OF POST, TEXAS.

DEMOUNTABLE WHEEL-RIM.

1,292,348.  Specification of Letters Patent.  Patented Jan. 21, 1919.

Application filed February 16, 1918. Serial No. 217,616.

*To all whom it may concern:*

Be it known that I, FRANK L. MAUPIN, a citizen of the United States, residing at Post, in the county of Garza and State of Texas, have invented new and useful Improvements in Demountable Wheel-Rims, of which the following is a specification.

This invention relates to demountable and sectional wheel rims, being especially designed for use in connection with automobiles, motor trucks and motor vehicles of all kinds.

The object of the invention is to produce a sectional or two part rim having novel means for reliably securing the sections or parts of the rim together so that there is no possibility of inopportune or accidental separations between the sections of the rim. At the same time the sections of the rim may be easily and quickly separated from each other by a person of very little mechanical ability and as easily and quickly reassembled. Furthermore the rim may be used in conjunction with any ordinary wheel structure in conjunction with which other demountable and sectional wheel rims are being used today.

With the above and other objects in view, the invention consists in the novel construction, combination and arrangement of parts, herein described, illustrated and claimed.

In the accompanying drawings:—

Figure 1:
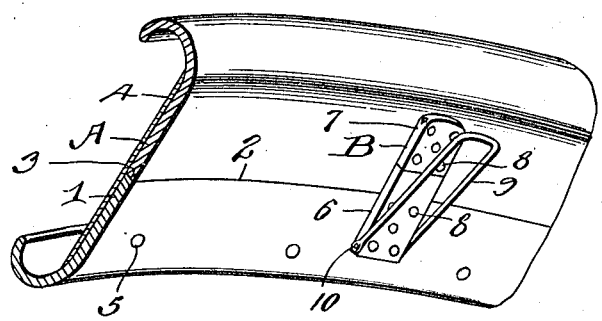
Figure 1 is a fragmentary perspective view of the improved demountable and sectional vehicle wheel rim.

Referring to the drawings A designates generally a demountable and sectional tire carrying rim for use upon the wheels of vehicles in general, the rim being shown as adapted to receive the ordinary detachable pneumatic tire.

Figure 2:
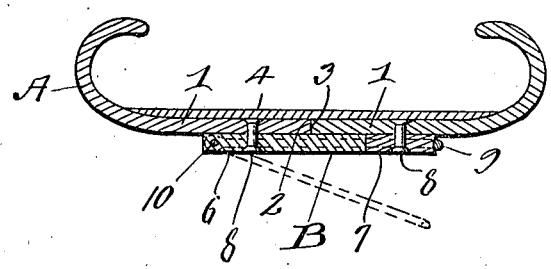
Fig. 2 is a cross section through the same in line with one of the rim fastening devices.

In carrying out the present invention, the rim A is primarily composed of twin sections 1 divided along a central circumferential line 2 with square abutting edges 3 normally lying in actual contact with each other. In order to protect the tire casing and inner tube, a floor plate 4 is secured to one of the sections of the rim by fastening means 5 such as rivets or the like. The protecting plate 4 is of sufficient width to considerably overlap the meeting edges 2 of the rim sections 1 as clearly shown in Figs. 1 and 2. This prevents any liability of pinching the casing or the inflating tube thereof.

The means for securing the sections of the rim together comprises any desired number of units B, as many of said units being ordinarily employed as there are rim clamps or rim securing devices now commonly used on vehicle wheels in conjunction with demountable rims. It is also preferred to locate the fastening units B mid-way between said rim clamps. Each unit B comprises two members 6 and 7 composed of metal of any suitable thickness, the same being secured by fastening means 8 such as rivets to the inner faces of the rim sections 1. One of the members 6 is of sufficient length to extend across and overlap both meeting edges of the rim sections 1. 9 designates a bail shaped link or fastener, said fastener being substantially U-shaped and being attached to the member 6 by a pivot or pin 10 which extends parallel to the meeting edges of the sections 1 of the rim. By reason of this arrangement, the free edge of the link or fastener 9 may be swung toward and away from the inner face of the rim so as to bring the same into and out of engagement with the member 7 of the rim fastening device. A screw driver or similar implement may be used to pry the link or fastener 9 away from the rim A and out of engagement with the member 7 of the fastening device. The link or fastener 9 may be returned to its locking position by foot pressure or with the aid of a hammer or mallet.

The device hereinabove described is extremely simple and economical to manufacture and will be found highly efficient and reliable in practice. The rim may be easily mounted upon any ordinary wheel in use today and held on the vehicle wheel by means of the usual rim clamps. When the fasteners or links 9 are in place, they prevent movement of the sections of the rim 1 both laterally and circumferentially. In fact when the rim is on the wheel, the sections of the rim are prevented from relative movement in all directions. Furthermore there are no detachable parts to become lost when the rim sections are separated from each other. No additional machinery is required for the manufacture of the improved rim other than the machinery now commonly employed for that purpose.

I claim:—

A vehicle wheel rim divided circumferentially into two annular sections abutting along their meeting edges, and fastening means for securing said rim sections in fixed relation to each other, said fastening means comprising fixed members secured to the inner faces of the rim sections, and a bail shaped fastener having a pivotal connection with one rim section on an axis parallel to the meeting edges of the rim sections, the free end of said fastener being movable into and out of engagement with one of said rim fastening members, one of said rim fastening members being of sufficient length to overlap the meeting edges of the rim sections.

In testimony whereof I, affix my signature.

FRANK L. MAUPIN.